INVENTOR
YASUHIRO OSHIMA
BY McGlew and Toren
ATTORNEYS

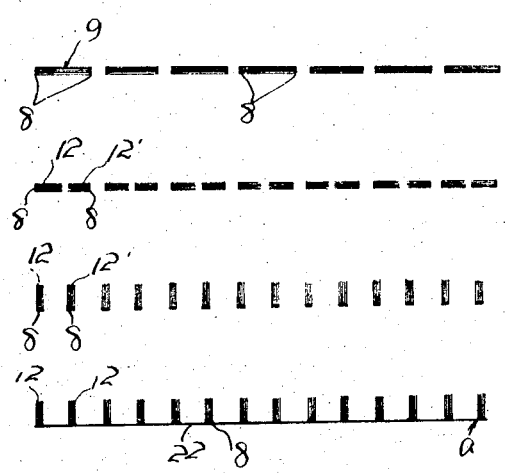
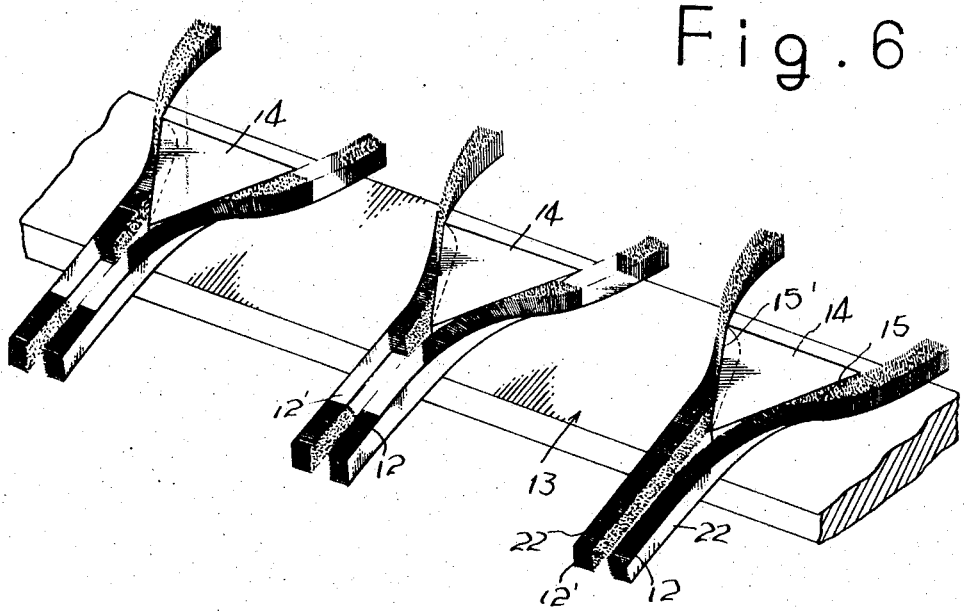

United States Patent Office

3,745,080
Patented July 10, 1973

3,745,080
METHOD OF PRODUCING PLASTIC SHEETS
Yasuhiro Oshima, % Meiwa Gravure Chemical Co., Ltd., 860 Kashida, Higashi Osaka, Japan
Filed Sept. 4, 1970, Ser. No. 69,692
Int. Cl. B32b 31/00
U.S. Cl. 156—154   1 Claim

ABSTRACT OF THE DISCLOSURE

In a method of the producing a nap-raised plastic sheet of high quality on a large scale and at a low cost, several thin thermoplastic resin films of same dimensions are overlapped to form a single plastic sheet and extended in the traverse direction thereof or embossed in said direction with a pattern of paralleled furrows; thereafter this plastic sheet is cut across said direction whereby the cut edges thereof are thermally sealed together by the heat produced when the sheet was cut at a high rate of speed or by the heat conducted thereto by the previously heated foremost ends of cutting blades with which the sheet is cut. The method further involves erecting these sealed edges in an upright posture, sticking the same inseparably to a plastic ground sheet and scratching the erected edges thereby to form a large number of flocculent nap elements.

SUMMARY OF THE INVENTION

The present invention relates to an improved method of napping or piling synthetic resin strip portions and making a napped plastic sheet therefrom, and more in particularly it relates to a novel method of producing a napped plastic sheet of high quality economically and on a large scale.

In a general way, a thin thermoplastic resin sheet to be used for producing nap elements of napped plastic sheets like carpets is composed of a synthetic resin material such as for example a polyvinyl chloride resin, a polyethylene resin, a polypropylene resin or the like. This plastic sheet is heated up to a temperature of between 80° C. and 90° C. and thermally extended three to seven times wider than its original width, thereafter being cooled down to a normal temperature while remaining in the extended condition. When this plastic sheet has been thermally extended in the traverse direction or embossed in said direction with a pattern of paralleled furrows, it gains such a special property that it is excessively reinforced with respect to said direction but is reversely weakened with respect to the direction with which said direction falls at right angles.

As conventionally well-known in the art of napping or piling a plastic sheet, inter alia, are citable the following methods (A) to (C); that is, firstly the method (A) in which a mass of molten plastic material is poured under pressure into a female mold having hollow portions for shaping nap elements thereby forming a plastic sheet having one surface on which nap elements are integrally raised upright; secondly, the method (B) or the so-called flock coating in which discontinuous filaments are planted inseparably on the outer surface of a plastic ground sheet by use of a binding agent; and lastly the method (C) in which the thermoplastic resin strips or monofilaments produced by thermally extending a thin plastic sheet comprising one of the above-mentioned resin materials are woven by means of a chiffon velveteen weaving machine.

However, all these methods (A) to (C) have such fatal defects that in (A) an expensive molding machine is required; that in (B) no more than napped elements of substantially short length can be planted and they easily fall out of the ground sheet; and that in (C) a chiffon velveteen weaving machine is substantially low in productivity and high in cost of production. Therefore, the napped plastic sheets produced in the above-mentioned methods have not been thoroughly popularized yet among consumers in general.

The present invention has succeeded in eliminating all these defects and disadvantages of the prior art by making the most of the aforesaid property peculiar to a thermoplastic resin sheet. Accordingly, it is one of the principal objects of the invention to provide an improved method of obtaining nap-raised plastic sheet. It is another object of the invention to provide such a method that can more easily obtain the comparatively long-size napped portions from a thin thermoplastic resin sheet by extending the same in the traverse direction or embossing the same in said direction with a pattern of paralleled furrows. It is further another object of the invention to provide a method of thermally sealing said plastic nap elements to a thermoplastic resin ground sheet at high speed and at a low cost.

BRIEF DESCRIPTION OF THE DRAWING

In the accompanying drawings in which:

FIG. 2 is a schematic of each strip portion formed by cutting a thermoplastic resin sheet with a discoidal cutting blade body;

FIG. 3 is a schematic of each tape portion formed by further cutting said strip portion equally into two;

FIG. 4 is a schematic of the state of each tape portion that has been raised upright;

FIG. 5 is a schematic of a semi-product of the erected tape portions having their respective one end sealed to a plastic ground sheet;

FIG. 6 is a perspective view extensively showing a guide plate;

DETAILED DESCRIPTION OF THE INVENTION

Figure 1:
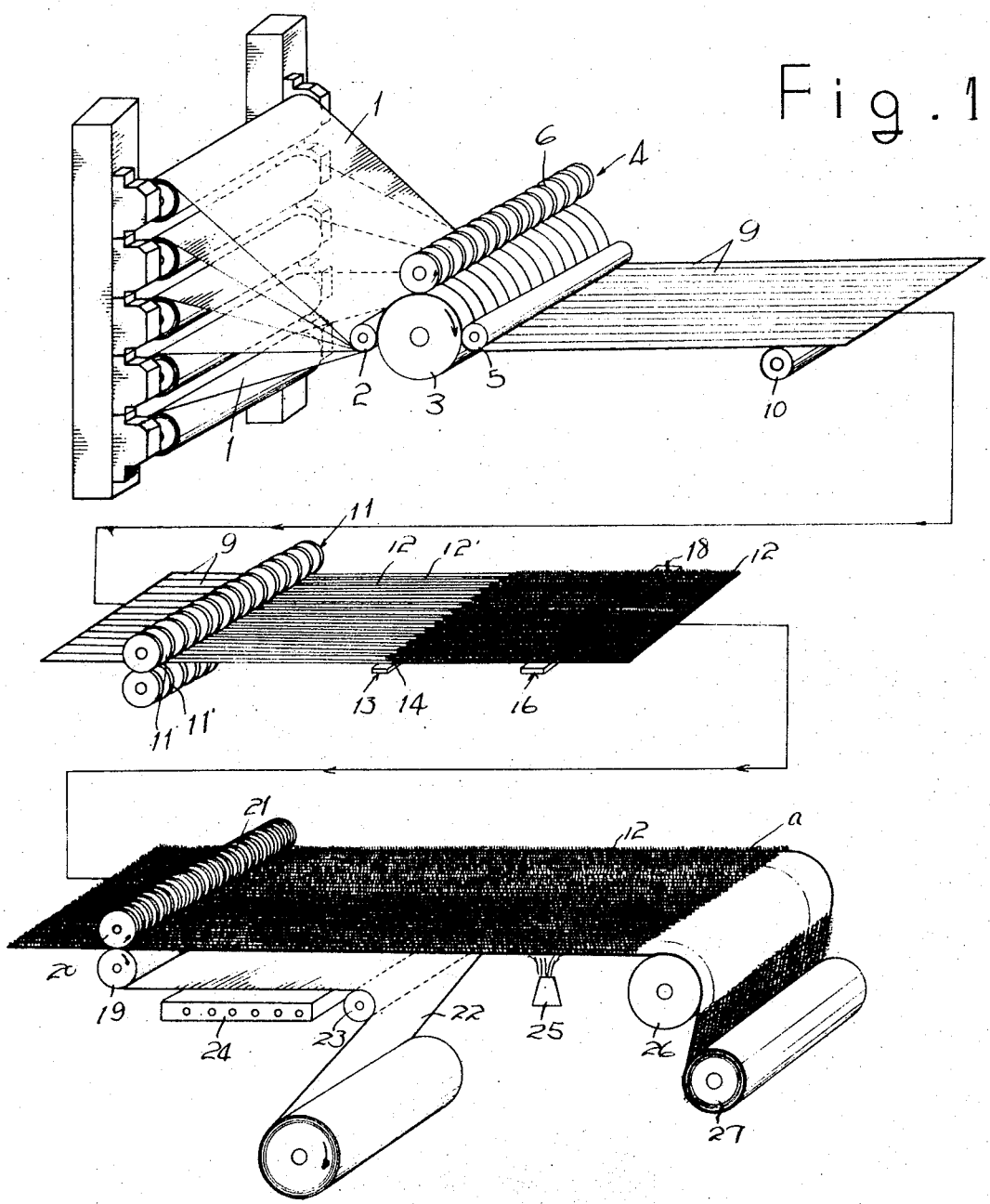
FIG. 1 is a perspective view illustrating one of the embodiments executed in accordance with the present invention.
Figure 7:
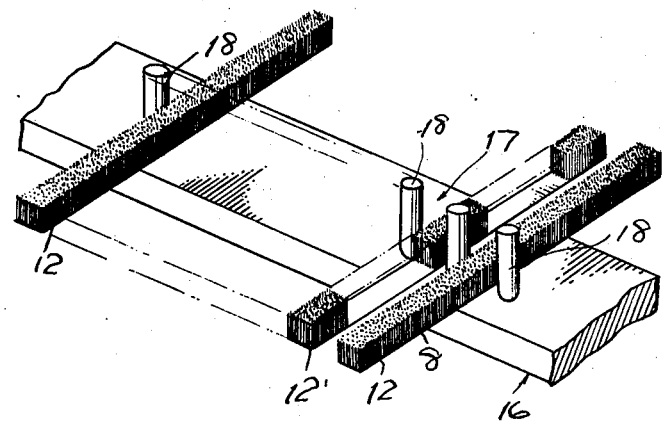
FIG. 7 is a perspective view showing a nap spacer extensively in parts.

Accounting in detail for the method of the present invention with reference to the accompanying drawings, reference numeral 1 designates each of the thermoplastic resin films thermally extended in the traverse direction or embossed in said direction with a pattern of paralleled furrows. These plastic films 1 are respectively composed for instance of a polyvinyl chloride resin film 0.1–0.7 mm. thick and about 1000 mm. wide.

As is best shown in FIG. 1 said plastic films 1 are held on a roll shaft supporting means for supporting the roll shafts of each film in such a manner that five to ten sheets thereof can be rolled back therefrom at the same time. A rotary cylinder 3 is arranged to rotate at the circumferential speed of about 10 meters per minute. A pair of rubber rollers 2 and 5 are mounted almost symmetrically and at a suitably spaced apart interval so as to contact the peripheral surface of said rotary cylinder 3. Between said rubber rollers 2 and 5 there is disposed a discoidal cutting blade body 4 comprising a plurality of discoidal structures 6 which are made from about 1 mm. thick steel, and provided respectively in its periphery with cutting blades, being mounted on the rotary shaft of the discoidal cutting blade body 4 at the regular distance occupied by the collars 30 to 50 mm. long. Therefore, the distance between the discoidal structures 6 is selectively changeable by replacing said collars with those of desired different length.

As will be subsequently described, the foremost end of said discoidal cutting blade body 4 is arranged to adjust its position in the upward and downward directions so that it can aptly shear said overlapped plastic films when they have been conveyed onto the outer peripheral surface of the rotary cylinder. This adjustment is made possible by moving upward and downward the rotary shaft to which said discoidal cutting blade body 4 is secured. To this rotary shaft there are secured a necessary number of discoidal structures 6 for cutting the full width (1000 mm.) of said plastic films 1 at the same time. Said discoidal cutting blade body 4 rotates at a circumferential speed exceeding ten times higher than the plastic films 1 and the rotary cylinder 3. Each of said thin plastic films 1 held on their respective roll shaft is rolled back therefrom, overlapped together to form a single plastic sheet and then pressed by means of the rubber rollers 2, 5 against the outer peripheral surface of the rotary cylinder 3 rotating at the circumferential speed of ten meters per minute, thereafter being transferred in the direction of the arrow shown in FIG. 1 along with the rotation of the rotary cylinder 3.

After that, they are cut by means of said discoidal cutting blade body 4 at intervals, for example, of 40 mm. in the direction that is at right angles with the direction where they have been extended or embossed.

The plastic films 1 have a characteristic that when they are cut by means of the discoidal cutting blade body 4 rotating at high speed, the cut edges thereof are integrally sealed to each other under the influence of the heat produced when they are cut. In addition they have a special property that when they are cut by the previously heated foremost end of the discoidal cutting blade body 4, the cut edges thereof are likewise sealed together by the heat conducted from said foremost end. Thus in case the plastic films 1 are cut, while remaining as extended as they were, in the position of the discoidal cutting blade body 4, the cut edges thereof are simultaneously sealed to each other as are shown by reference numeral 8 in FIG. 2 resulting in a plurality of 40 mm. wide plastic strips 9 being formed.

Said plurality of plastic strips 9 are guided to a guide roller 10 positioned in the rear of said rotary cylinder 3 and further transferred toward a bobbin cutter 11 of conventional type adapted to cut these plastic strips 40 mm. wide equally into two tapes each 20 mm. wide. Said bobbin cutter 11 rotates at the same speed as the strips 9 are transferred or at the same circumferential speed of the rotary cylinder 3. These strips having their cut edges thermally sealed together, are further cut between round blade 11' mounted in opposed relation with each other so that they are divided equally into two tape portions 12, 12' without now being thermally sealed to each other as are shown in FIG. 3. Consequently there are obtained a plurality of 20 mm. wide tape portions 12, 12' having the outer edges thermally sealed together as have been referred to by numeral 8, while the inner edges remain as cut as they were.

Said tape portions 12, 12' are now transferred to reach a guide plate 13 in the rear of said bobbin cutter 11, divided into two through the foremost ends of bow-shape tape portion erecting means 14 mounted at regularly spaced apart intervals and then further transferred along the two opposed faces 15, 15' of said bow-shape tape erecting means 14. Said two opposed faces 15, 15' are so shaped as are expanded and inclined in the upward and rearward directions thereby taking the form of a bow.

Therefore the tape portions 12, 12' are erected in turn to take an upright posture according as they move along said two opposed faces 15, 15' as shown in FIG. 6, consequently the sealed portions 8 being directed downwards.

The tape portions 12, 12' are further transferred in an erected posture until they reach a nap spacer 16 provided backward of the guide plate 13 including spacer elements 18 mounted pectenately on a nap base 17 at regularly spaced apart intervals. Thus when the tape portions 12, 12' pass through this nap spacer 16, said spacer elements 18 work to arrange in an orderly manner each space between the tape portions 12, 12'. Then these tape portions are, with their sealed portions 8 directed downward and each space between the sealed portions arranged in order as have been mentioned, further transferred to a couple of pressing rollers 19, 20 mounted in mutually opposed relation behind said nap spacer 16, being pressed between said pressing rollers 19, 20 so that they are stuck inseparably to the outer surface 22 of a plastic ground sheet in the manner that will be just hereinafter referred to. Namely, as is shown by numeral 20, one of said pressing rollers 19, 20 is positioned above the upper part of the other, and includes annular recesses 21 which are 18 mm. high and as thick as said sealed portions 8 on said overlapped films 1, being spaced regularly at the distance interspacing between said spacer elements 18.

Therefore the tape portions 12, 12' can pass through these annular recesses 21 without being pushed down by the pressing rollers 19, 20.

As a plastic ground sheet on which these tape portions 12, 12' are napped, for example to produce a carpet or the like is used a thermoplastic resin sheet 22 of about 0.7 mm. in thickness. Said sheet 22 which is held on a roll shaft is rolled back therefrom and heated up to a temperature between 150° C. and 200° C. by means of a heater 24 mounted between said pressing roller 19 and a guide roll 23 thereby to be supplied to the pressing rollers 19, 20 and thermally sealed therebetween integrally to the sealed portions 8.

Incidentally, when the tape portions 12, 12' are transferred through the annular recesses 21 there is produced a pressing force between the pressing rollers 19, 20 because the former is 20 mm. high in an erected posture whereas the latter is 18 mm. high as mentioned above. Furthermore, when said ground sheet 22 and the tape portions 12, 12' napped thereon are transferred through the annular recesses 21, they are properly strained between the pressing rollers 19, 20 and a roll shaft 27 which will be subsequently described.

Thus the tape portions 12, 12' and the plastic ground sheet 22 are integrally sealed to each other thereby to form the so-called semi-product of the tape portions sealed in an upright posture to this plastic sheet.

Said semi-product shown by reference $a$ in FIG. 5 is cooled down to a normal temperature by means of an electric cooling motor fan 25 and a cooling roller 26 mounted in the rear of the pressing rollers 19, 20, and thereafter rolled up on the roll shaft 27.

In place of the heater 24 mentioned above, a conventional binding agent spreader may be used to spread a binding agent throughout the outer surface of the plastic ground sheet so as to stick thereto the tape portions 12, 12'. In this case, however, it is necessary to use a heating dryer instead of said electric cooling motor fan 25 and said cooling roller 26.

When the binding agent spreader is employed for the sticking purpose, the method of the present invention is applicable also to a ground sheet made from rubber, synthetic fibers and the like as well as to aforesaid plastic ground sheet.

The semi-product $a$ obtained in this way is such that the tape portions 12, 12' of 20 mm. in length are inseparably stuck to the plastic ground sheet 22 in an erected posture and at regularly spaced apart intervals. The plastic ground sheet 22 can be reinforced by using a metallic mesh netting tarpaulin sheet or a tarpaulin sheet wherein a nylon or any other similar synthetic yarn weaving cloth is sandwiched.

Further it is possible to give ventilation and porosity to the ground sheet by freely perforating the furrowed area between the sealed portions 8.

Figure 8:
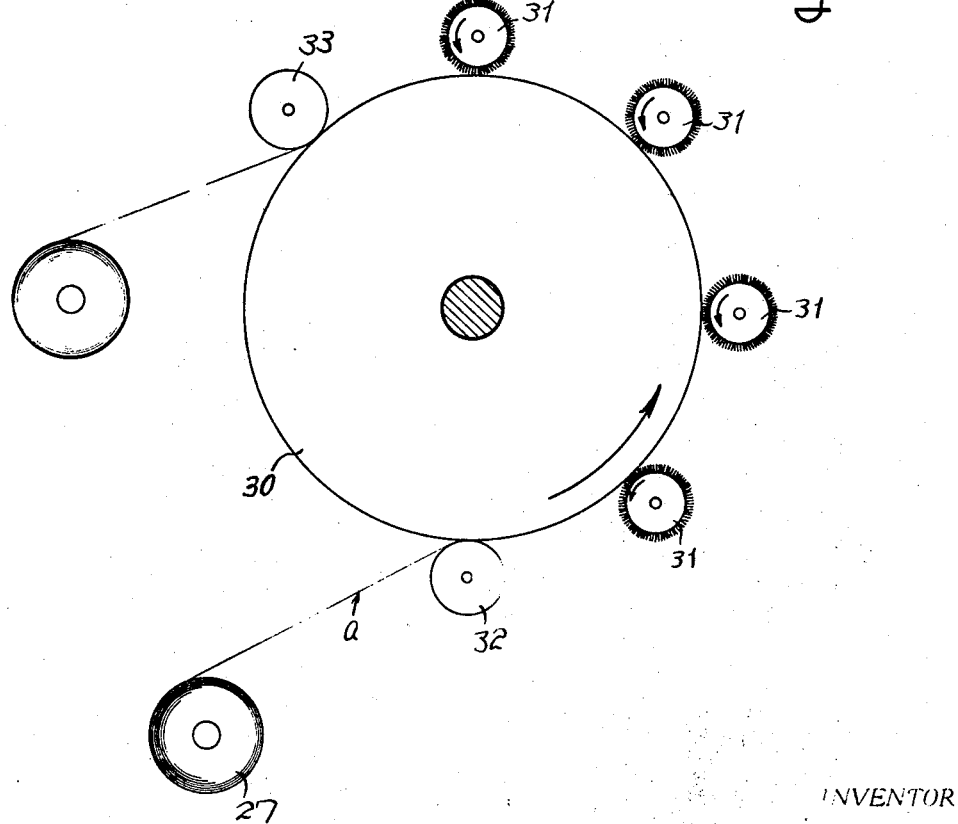
FIG. 8 is a diagrammatic view of a nap-raising machine.
Figure 9:
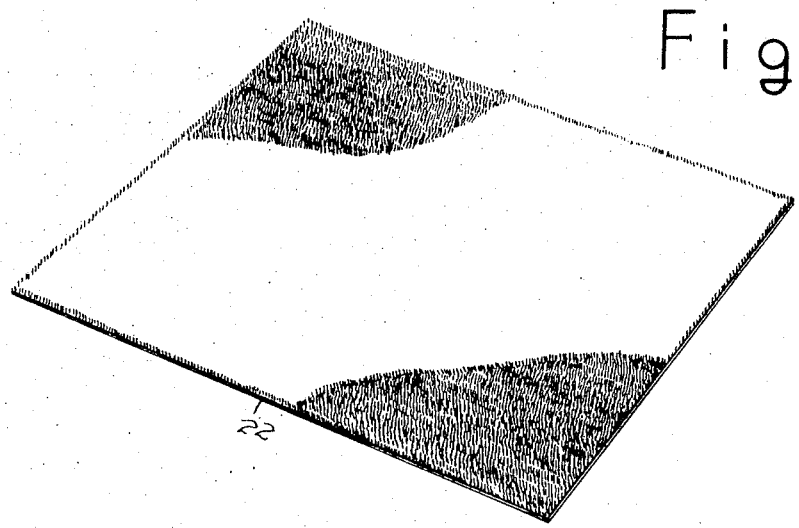
FIG. 9 is a perspective view partially showing a finished product of a napped plastic sheet.

During the following processes, the semi-product *a* is put on a nap raising machine as in the manner shown in FIG. 8. Said nap raising machine comprises a rotary cylinder 30 rotatable at the circumferential speed of about 10 meters per minute, a plurality of porcupine rollers 31 slightly engaged with the outer periphery of said rotary cylinder 30 and rotatable in the opposed direction thereof at the high circumferential speed of 30 meters per minute, and a pair of pressing rollers 32, 33 for pressing the semi-product *a* against the outer periphery of the rotary cylinder 30. The semi-product *a* which is rolled up on the roll shaft 27 is rolled back therefrom and pressed against the outer periphery of the rotary cylinder 30 by means of said pair of pressing rollers 32, 33, being stuck to this periphery and thereafter transferred in the direction of the arrow shown in FIG. 8 along with the rotation of the rotary cylinder 30. At this time the tape portions 12, 12′ of the semi-product *a* are scratched by said porcupine rollers 31.

As has been referred to, the thermoplastic resin films 1 have such a property peculiar thereto that when extended in one direction or embossed in said direction with a pattern of paralleled furrows, they become very strong with respect to the direction where they were extended or embossed whereas they become reversely very weak with respect to the direction across said direction. For this reason the tape portions 12, 12′ are easily torn away to become ultra thin and flocculent nap elements at the rate of 10 meters per minute.

In other words, the tape portions 12, 12′ integrally sealed in an upright posture to the plastic ground sheet 22 are changed into an ultra thin and filamentary state at aforesaid high speed so that they serve as the plastic nap elements or the so-called finished product having the outer appearance of a conventional type carpet or the like.

Any preferred thickness or denier of these nap elements can be obtained merely by changing the position of the tape portions to be scratched, or by using the pattern of more narrowly or more widely paralleled furrows to be embossed with. Therefore, according to the method of this invention, it is quite possible to obtain any kind of the nap elements raised on a plastic ground sheet thereby freely producing various kinds of plastic carpets or the like.

As is clearly evident, therefore, the method of the present invention is carried out by overlapping several thin plastic films to form a single plastic sheet, extending this sheet in one direction or embossing the same in said direction with a pattern of paralleled furrows, thereafter cutting the sheet crosswise of said direction thereby to seal the cut edges together, then sticking the sealed edges inseparably to a plastic ground sheet, and lastly tearing away the cut edges until they are changed into a flocculent and filamentary state.

It is thought that the invention and many of its attendant advantages will be understood from the foregoing description, and it will be apparent that various changes and modifications may be made in the form, construction and arrangement of the parts without departing from the spirit and scope of the invention or sacrificing all of its material advantages, the form hereinbefore being merely preferred embodiment thereof.

The embodiments of the invention in which an exclusive property or privilege is claimed are defined as follows:

1. A method of producing a napped plastic sheet comprising the steps of superimposing several longitudinally extending thin thermo-plastic sheets of the same dimensions which films have been thermally extended in the direction transverse to their long dimension; thermally cutting the superimposed films into a plurality of longitudinally extending strips having a desired width in the direction falling at right angles with said transverse direction; thermally sealing each cut edge of said strips to form a plurality of tapes having both edges of the strips sealed together; cutting each of the tapes longitudinally equally in two for forming a pair of cut tape portions each having one edge sealed; turning each of the cut tape portions through an angle of 90° about its longitudinal axis for directing its sealed edge downwardly; arranging the plurality of cut tape portions with their sealed edges directed downwardly in a manner so that they stand in side-by-side lines in an orderly manner; adhering integrally the sealed edges of the tape portions to the outer surface of a ground sheet; and scratching the edges opposite the sealed edges adhered to the ground sheet for forming flocculuent and filamentary nap elements.

References Cited
UNITED STATES PATENTS

| | | | |
|---|---|---|---|
| 3,390,034 | 6/1968 | Hull | 156—72 |
| 3,081,614 | 3/1963 | Salick | 156—72 X |
| 1,887,477 | 11/1932 | Slater | 156—72 X |
| 3,546,058 | 12/1970 | Loew | 156—209 X |
| 3,574,020 | 4/1971 | Wisotzky | 156—209 X |
| 2,711,779 | 6/1955 | Carland | 156—251 |
| 3,505,154 | 4/1970 | Logrippo | 156—204 X |
| 3,560,322 | 2/1971 | Magid | 156—209 X |
| 2,491,258 | 12/1949 | Fuhrop et al. | 156—265 X |
| 3,575,778 | 4/1971 | Wilcox | 156—72 X |
| 3,250,655 | 5/1966 | Adler | 156—265 X |

WILLIAM D. MARTIN, Primary Examiner

M. R. LUSIGNAN, Assistant Examiner

U.S. Cl. X.R.

156—260, 271